March 21, 1967     H. D. ADAMS     3,310,032
BIRD RELEASER FOR BIRD DOG TRAINING DEVICE
Filed Oct. 22, 1965     3 Sheets-Sheet 1
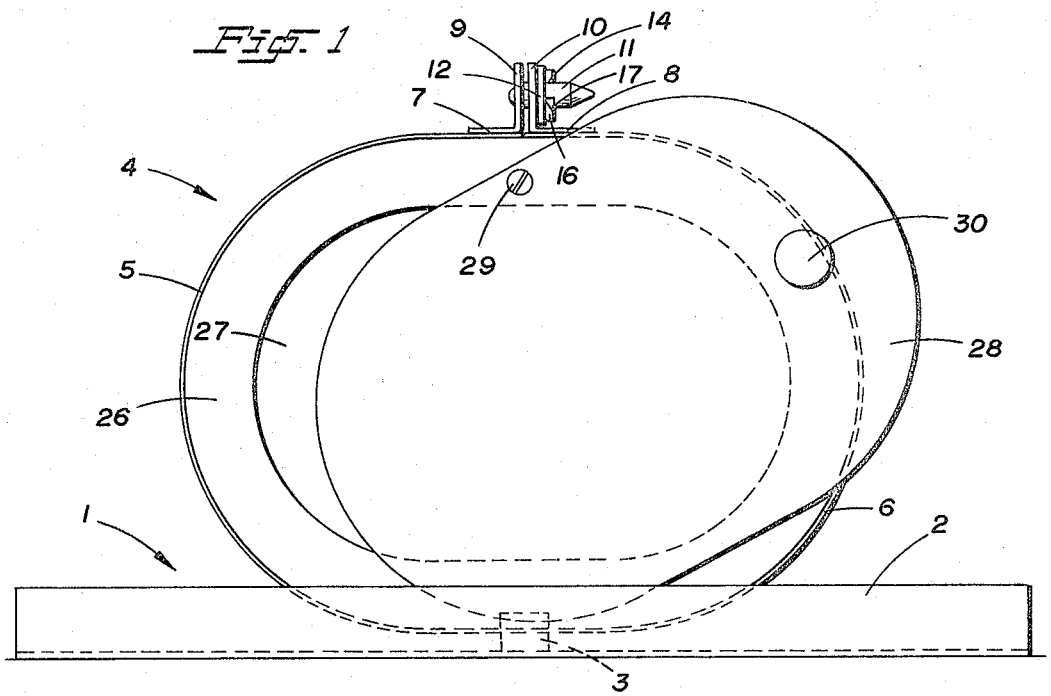
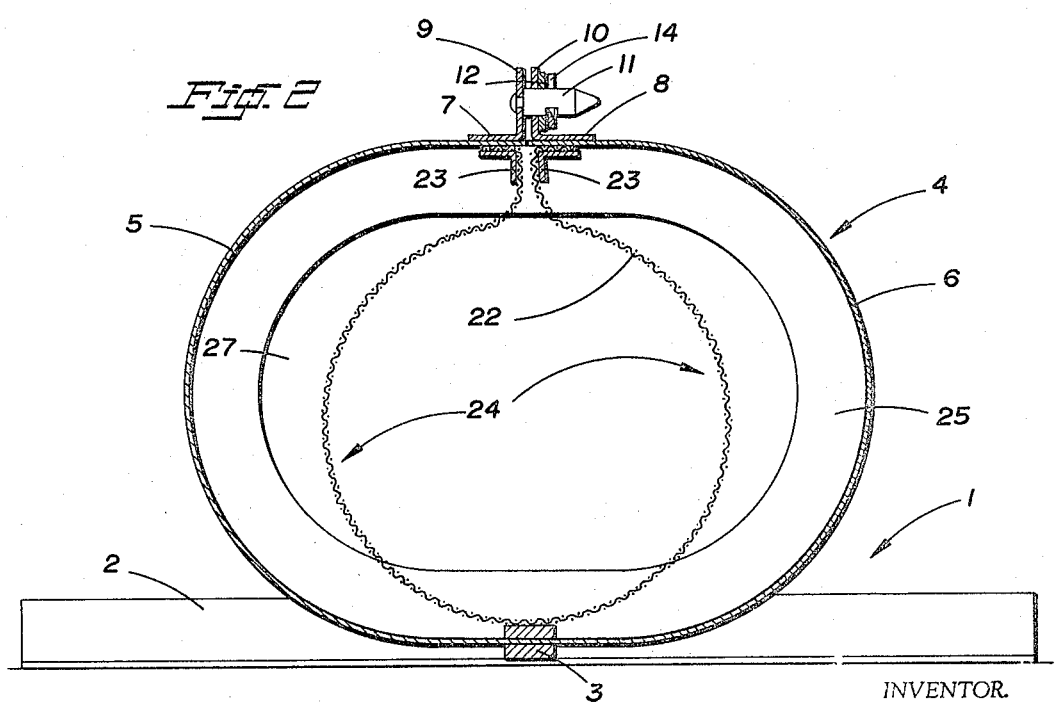
INVENTOR.
Hugh D. Adams
BY
Webster & Webster
ATTORNEYS

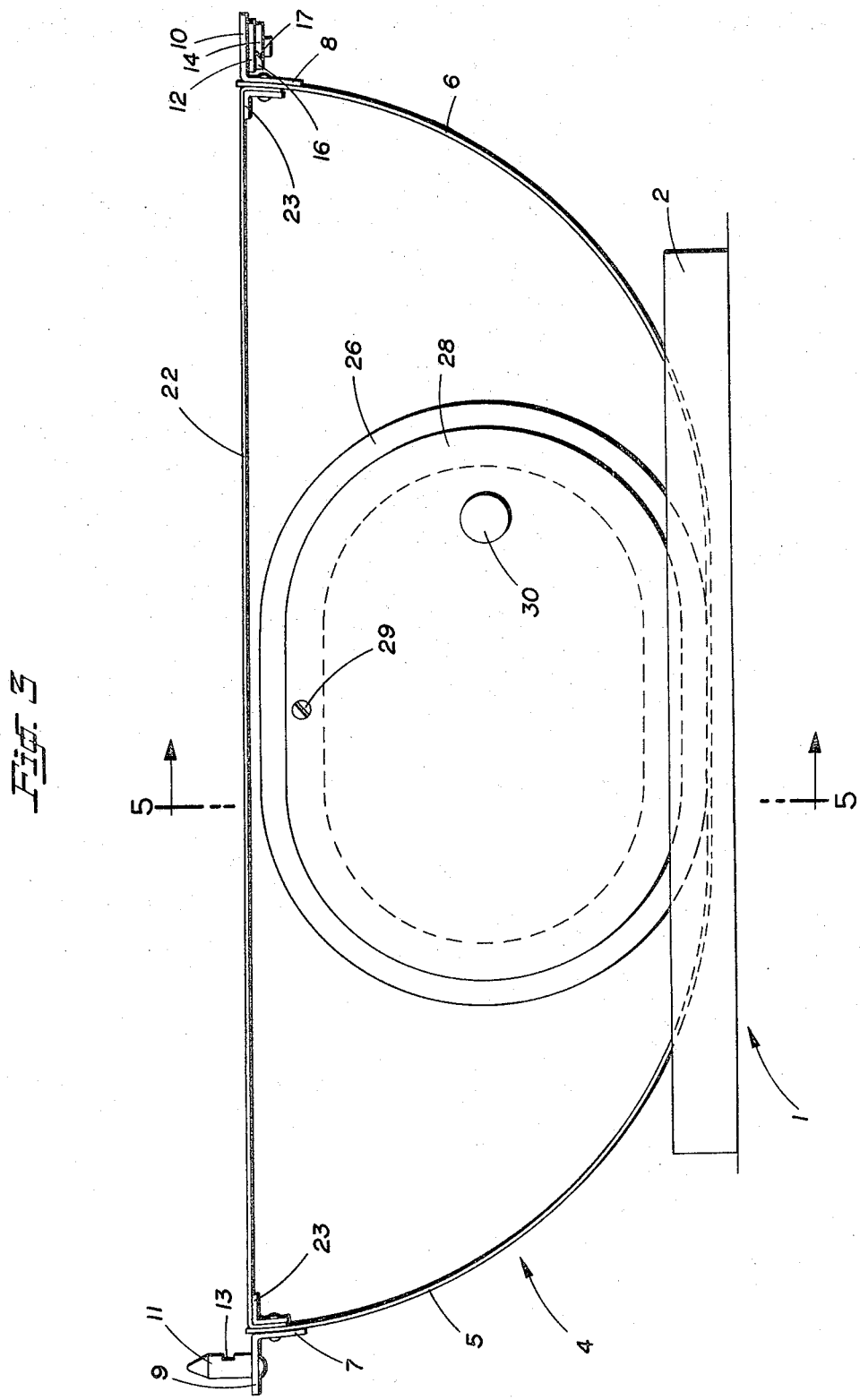

March 21, 1967  H. D. ADAMS  3,310,032
BIRD RELEASER FOR BIRD DOG TRAINING DEVICE
Filed Oct. 22, 1965  3 Sheets-Sheet 3
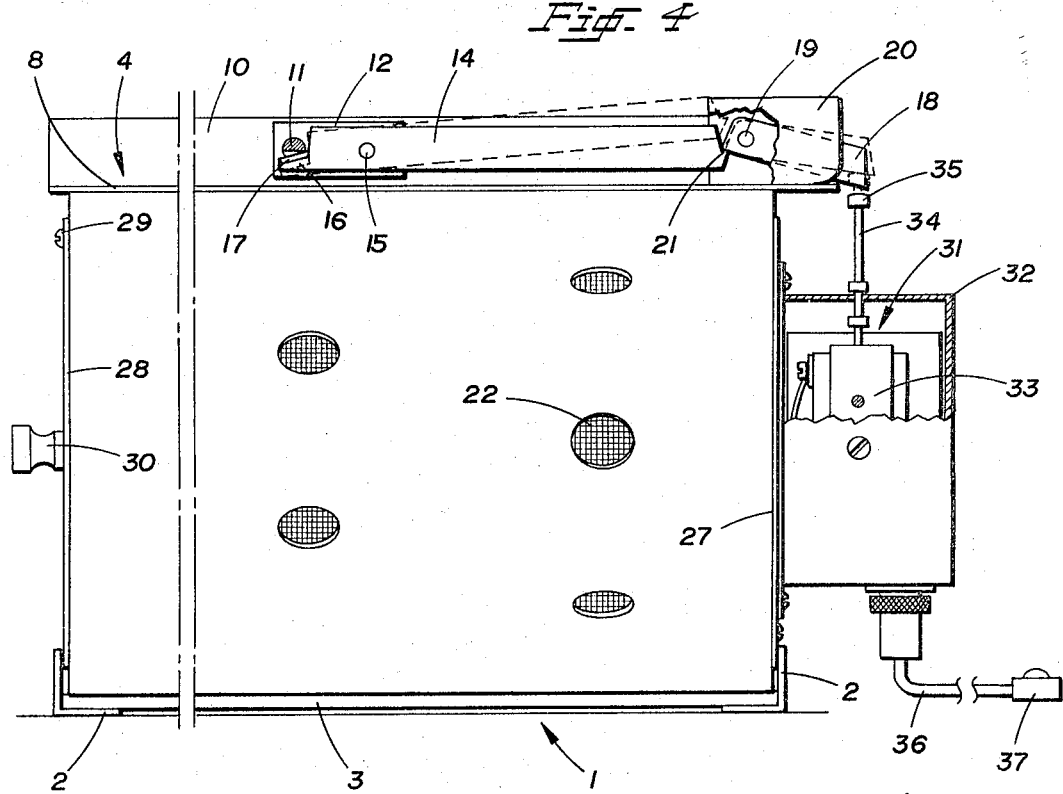
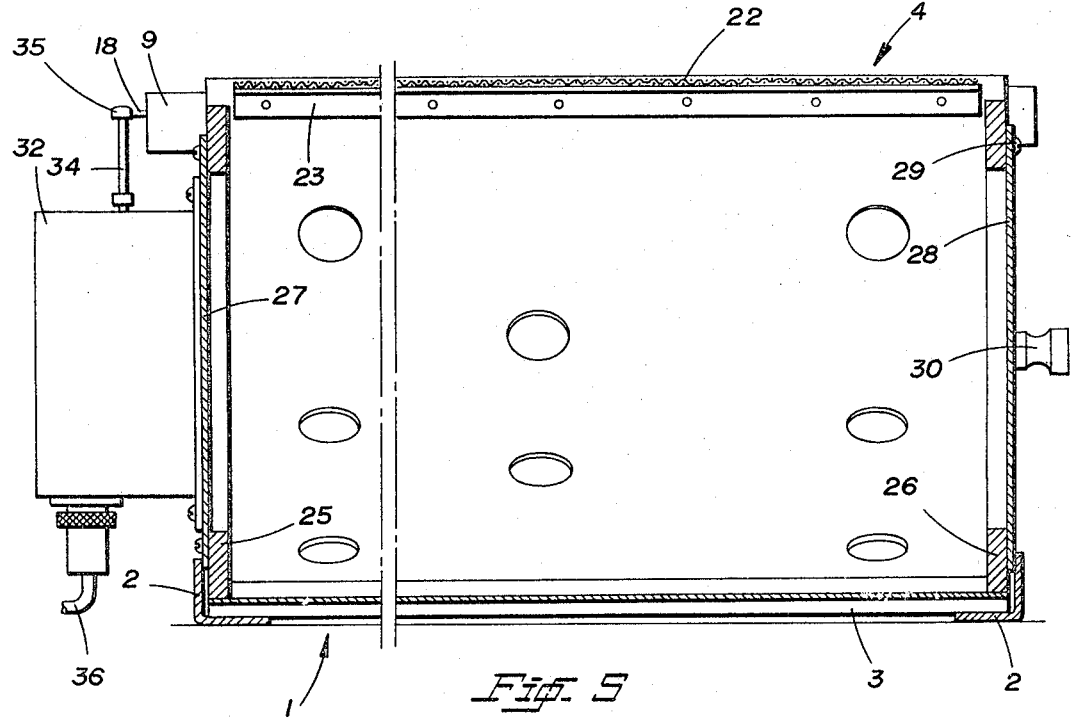

United States Patent Office 3,310,032
Patented Mar. 21, 1967

3,310,032
BIRD RELEASER FOR BIRD DOG
TRAINING DEVICE
Hugh D. Adams, 625 N. Verduga Road,
Turlock, Calif. 95380
Filed Oct. 22, 1965, Ser. No. 501,868
9 Claims. (Cl. 119—15.6)

This invention relates in general to a novel device for use in field training a bird dog to point and retrieve.

In field training a dog with a live game bird (such as a pheasant, chukar, or quail), the bird is first manually placed in brush or other cover; it being difficult, however, to keep the bird in position in such cover until the dog can be brought up to the point and the bird then flushed for the kill by the gun handler, and subsequent retrieve by the dog.

It is, therefore, the major object of this invention to provide a novel initially closed but openable cage device for use in field training a bird dog in the manner described; the game bird being disposed in such cage device when placed in the cover, and said device being opened by remote control to release the bird when the latter is pointed by the dog. By virtue of the use of the cage device of the present invention, the game bird cannot move out of position in the brush or escape therefrom prior to pointing by the dog.

Another important object of this invention is to provide a cage device, as in the preceding paragraph, which includes a novel, initially downwardly looped sling which cradles the game bird in the device while awaiting pointing by the dog, but which sling snaps taut and tosses the bird relatively high in the air (in simulation of a natural flush) when said device quick-opens under the influence of included spring means.

A further object of the invention is to provide a bird dog training device which is designed for ease and economy of manufacture, as well as convenience of transport and use.

A still further object of the invention is to provide a practical, reliable, and durable bird dog training device and one which is exceedingly effective for the purpose for which it is designed.

These objects area ccomplished by means of such structure and relative arrangement of parts as will fully appear by a perusal of the following specification and claims.

In the drawings:

FIG. 1 is an end elevation of the cage device in closed position; the view being of the end including the door, and the latter being shown partially open.

FIG. 2 is a sectional elevation of the cage device in closed position as in FIG. 1; the view being taken transversely through the sling and surrounding body.

FIG. 3 is an elevation similar to FIG. 1 but shows the cage device in its released or open position.

FIG. 4 is an elevation of the cage device from one side thereof and in closed position; the view being partly broken away and partly in section.

FIG. 5 is a sectional elevation of the cage device in open position; the view looking in the direction opposite FIG. 4.

Referring now more particularly to the drawings and to the characters of reference marked thereon, the bird dog training device comprises a support or base, indicated generally at 1; such base, which is H-shaped in plan, comprising spaced longitudinal rails 2 connected centrally of their ends by a cross bar 3.

The cross bar 3 supports a substantially cylindrical, transversely extending body indicated generally at 4. Such body 4 is comprised of an elongated rectangular sheet of flexible but spring steel fixed centrally of its ends to the cross bar 3; such sheet being of a width substantially equal to the length of cross bar 3 but terminating in clearance relation to the rails 2.

The opposed longitudinal halves or sections of the flexible but spring steel sheet are indicated at 5 and 6; such sections—when the cage device is set for use—being bowed upwardly and inwardly to place them under substantial load or tension and with the free edge portions of such sections in closely adjacent or substantially abutting relation. The sections 5 and 6 thus normally provide the substantially cylindrical body 4.

To maintain the sections 5 and 6 in their normally bowed, body forming positions, the following latch means is provided:

At their closely adjacent free edge portions, the sections 5 and 6 are provided with cross bars 7 and 8 which include outwardly projecting flanges 9 and 10, respectively, in adjacent facing relation. Centrally of its ends, the flange 9 is provided with a fixed, taper-nose latch pin 11 which projects through a matching opening in the flange 10 and a spacer plate 12 secured on the latter; said latch pin 11 extending some distance beyond the spacer plate 12, and outwardly of the latter said pin is formed with a downwardly opening notch 13.

In one direction from the latch pin 11, an elongated latch arm 14 extends along the outer face of the flange 10, and such latch arm is pivoted to the latter as at 15; the pivot point being relatively close to said pin.

At the end adjacent said latch pin 11, the latch arm 14 is provided with a short longitudinally projecting tip 16, the upper edge portion of which normally engages in the notch 13 to prevent withdrawal of the pin from the flange 10. Such upper edge portion of the tip 16 is provided with a bevel face 17 for the purpose later described.

The latch arm 14 is normally prevented from upward movement at the outer end (i.e., the end opposite the tip 16) by means of a relatively short trigger finger 18 which projects outwardly from said outer end of the latch arm. Such trigger finger 18 is pivoted adjacent but short of its inner end, as at 19, within a flange-mounted yoke 20 into which the adjacent or outer end of the latch arm 14 also extends. At its inner lower corner, the trigger finger 18 normally bears against a short upwardly facing shoulder or sear 21 on said outer end of the latch arm 14; the trigger finger then inclining downwardly and outwardly and resting in stop engagement against the cross bar 8.

Upon slight upward movement of the trigger finger 18, the lower inner corner thereof escapes the sear 21 whereupon the related portion of the latch arm 14 is free to swing upwardly about pivot 15 and which occurs by reason of the latch pin 11 (which is under tension) bearing against the bevel face 17 and forcing tip 16 downward. The tip 16 thus escapes the notch 13 whereupon the latch pin 11 withdraws from the flange 10 and the opposed sections 5 and 6 forcefully snap apart to the position of FIG. 3. The purpose of this action will later appear.

An elongated, rectangular, flexible panel 22—preferably a heavy duty plastic screen—is secured at its ends to the normally adjacent edge portions of the sections 5 and 6 by means of corresponding cross members 23. The screen panel 22—which is slightly narrower than the sections 5 and 6—is of a length such that said panel normally depends in the substantially cylindrical body 4 in the form of a downwardly looped sling, indicated generally at 24.

The substantially cylindrical body 4 and the sling 24 depending therein are closed at the ends (but without obstructing movement of the sections 5 and 6 forming body 4, or the panel 22 forming said sling) by means of upstanding open end frames, indicated at 25 and 26. The end frames 25 and 26 are fixed to and upstand from corresponding cross bar 3; said end frames being provided with closure plates, indicated at 27 and 28, respectively. The closure plate 27 is fixed with respect to its end frame 25, whereas the closure plate 28 is pivoted at the top, as at 29, to provide a door whereby access may be had to one end of the sling 24. The door-forming plate 28 is fitted on the outside with a finger knob 30.

The body forming sections 5 and 6 are normally positioned in close wrap-around relation to the upstanding end frames 25 and 26, while the ends of the sling 24 are disposed closely adjacent but inwardly of said frames.

When the above described cage device is in use, a game bird is first placed in the sling 24, access to which is provided by the door-forming plate 28; the latter then being closed and at which time the lower portion of such door engages in frictional holding relation between the end frame 26 and the adjacent rail 2.

With the bird disposed in the sling 24 of the cage device, the latter is placed in cover such as brush, and thereafter the dog training exercise begins. Upon the dog pointing the bird in the cage device, the pin 11 is unlatched whereupon it escapes the flange 10 followed by the sections 5 and 6 forcefully springing apart. When this occurs, the flexible panel 22 is snapped from its sling form, as in FIG. 2, to a taut horizontal position, as in FIG. 3; this resulting in the game bird being tossed relatively high in the air in simulation of a natural flush. Upon the bird thus being tossed into the air, it is shot by the gun handler. The dog then makes the retrieve.

As it is desired that unlatching of the pin 11 be accomplished by remote control, the following arrangement is provided:

A battery powered solenoid unit, indicated generally at 31, is mounted in a housing 32 secured exteriorly to the end closure plate 27 and thus directly below the trigger finger 18 of the described latch means.

The unit 31 includes a solenoid 33 having a vertical plunger 34 which projects through the top of the housing and to a termination thereabove immediately adjacent but below the outer end of the trigger finger 18; the upper end of such plunger 34 being provided with a head 35. The unit 31 also includes a long circuit wire cable 36 which leads to a push button switch 37. The push button switch 37 can thus be operated from a point quite distant from the cage device and dependent only on the length of cable 36.

The operator—upon observing the dog on point—presses the push button switch 37 which causes the solenoid 33 to operate and thrust the plunger 34 upwardly. When this occurs, the head 35 strikes and raises the outer end of the trigger finger 18 whereupon the pin 11 is unlatched so that the cage device flies open and the bird is tossed into the air.

The body 4 is formed—as shown—with a plurality of openings or ports in order to assure that the scent of the bird may pass from the cage device and be carried in the air currents; this being necessary for the dog to smell the bird and then point the same.

From the foregoing description, it will be readily seen that there has been produced such a bird dog training device as substantially fulfills the objects of the invention, as set forth herein.

While this specification sets forth in detail the present and preferred construction of the bird dog training device, still in practice such deviations from such detail may be resorted to as do not form a departure from the spirit of the invention, as defined by the appended claims.

Having thus described the invention, the following is claimed as new and useful and upon which Letters Patent is desired:

1. A cage device, for reception and subsequent release of a live bird during training of a bird dog, comprising a support, spring means mounted on the support, said spring means normally being under load and including opposed members releasably latched together and having adjacent edge portions, said members forcefully springing apart when unlatched, a flexible panel secured at opposite ends to said adjacent edge portions of the members and initially depending therefrom as a downwardly looped sling for reception of the bird, means closing the sling at the ends without obstructing movement of said members, and means to unlatch said members whereby the latter forcefully spring apart and the flexible panel snaps taut and tosses the bird into the air in simulation of a natural flush; and wherein the spring means comprises an elongated sheet of flexible but spring steel secured intermediate its ends to the support, the opposed longitudinal sections of such sheet being said members, and such sections being upwardly and inwardly bowed to place them under load and to provide a substantially cylindrical body surrounding the sling, said adjacent edge portions being those of the bowed sections.

2. A cage device, as in claim 1, in which the means to unlatch said members includes a remote control instrumentality.

3. A cage device, as in claim 1, in which the means to unlatch said members includes a solenoid, and a remotely disposed switch arranged to control actuation of said solenoid.

4. A cage device, as in claim 1, in which said closure means comprise end plates mounted in connection with and upstanding from the support closely adjacent the ends of the sling; one such end plate providing a door for placement of the bird in said sling.

5. A cage device, for reception and subsequent release of a live bird during training of a bird dog, comprising a support, an elongated sheet of flexible but spring steel secured intermediate its ends to the support, the opposed longitudinal sections of said sheet being normally upwardly and inwardly bowed to place them under load and to provide a substantially cylindrical body, remote controlled releasable latch means connecting adjacent edge portions of said bowed sections, the latter forcefully springing apart upon release of said latch means, a flexible panel secured at opposite ends to related edge portions of said sections, said panel normally depending from said edge portions as a downwardly looped sling within the body and for reception of the bird, and means closing the sling at the ends without obstructing movement thereof or of said sections; the flexible panel being snapped taut and the bird tossed into the air when such sections forcefully spring apart upon release of the latch means.

6. A cage device, as in claim 5, in which the closure means at one end of the sling provides a door for placement of a bird in said sling.

7. A cage device, as in claim 6, in which the support is a frame H-shaped in plan and including a cross bar; the spring steel sheet being secured to and projecting in opposite directions from said cross bar.

8. A cage device, as in claim 6, in which the support is a frame H-shaped in plan and including spaced longitudinal rails; said closure means being end frames upstanding from said rails, and end closure plates on said frames.

9. A cage device, as in claim 8, in which one of said end closure plates is movably mounted to provide a door for placement of a bird in said sling.

References Cited by the Examiner

UNITED STATES PATENTS

| | | | |
|---|---|---|---|
| 2,504,763 | 4/1950 | Voecks | 119—15.6 |
| 2,642,036 | 6/1953 | Stuart | 119—15.6 |
| 2,704,050 | 3/1955 | Stachowski | 119—15.6 |
| 3,063,412 | 11/1962 | Colsher et al. | 119—15.6 |
| 3,080,850 | 3/1963 | Schrougham | 119—15.6 |

SAMUEL KOREN, *Primary Examiner.*

ALDRICH F. MEDBERY, *Examiner.*